United States Patent
Mengrone et al.

(10) Patent No.: US 6,888,463 B1
(45) Date of Patent: May 3, 2005

(54) MOTOR VEHICLE THEFT DETECTION DEVICE

(76) Inventors: Frank Mengrone, 675A Yarborough Way South, Monroe Township, NJ (US) 08831; Deborah Mengrone, 675A Yarborough Way South, Monroe Township, NJ (US) 08831

( * ) Notice: Subject to any disclaimer, the term of this patent is extended or adjusted under 35 U.S.C. 154(b) by 0 days.

(21) Appl. No.: 10/189,985

(22) Filed: Jul. 8, 2002

Related U.S. Application Data

(63) Continuation-in-part of application No. 09/767,071, filed on Jan. 23, 2001, now abandoned.

(51) Int. Cl.[7] .............................................. G08B 13/14
(52) U.S. Cl. .................. 340/571; 340/426.1; 340/815.4
(58) Field of Search .............................. 340/571, 426.1, 340/568.6, 539.1, 568.1, 815.4, 539.15, 426.11, 425.5, 426, 539; 342/457

(56) References Cited

U.S. PATENT DOCUMENTS

| | | | | |
|---|---|---|---|---|
| 4,442,426 A | * | 4/1984 | Heuschmann et al. ...... | 340/539 |
| 4,675,656 A | * | 6/1987 | Narcisses .................... | 340/539 |
| 4,924,206 A | * | 5/1990 | Ayers ......................... | 340/426 |
| 5,003,317 A | * | 3/1991 | Gray et al. .................. | 342/457 |
| 5,289,163 A | * | 2/1994 | Perez et al. ................. | 340/539 |
| 5,652,569 A | * | 7/1997 | Gerstenberger et al. . | 340/573.4 |
| 5,838,227 A | * | 11/1998 | Murray .................. | 340/539.21 |
| 5,952,921 A | * | 9/1999 | Donnelly ................. | 340/568.6 |
| 5,963,130 A | * | 10/1999 | Schlager et al. ............ | 340/540 |
| 6,150,928 A | * | 11/2000 | Murray ........................ | 340/426 |
| 6,507,276 B1 | * | 1/2003 | Young et al. ............... | 340/447 |

* cited by examiner

*Primary Examiner*—Phung Nguyen
(74) *Attorney, Agent, or Firm*—Goldstein Law Offices, P.C.

(57) ABSTRACT

An motor vehicle theft detection device, for warning a property owner that an motor vehicle has been brought beyond a predetermined acceptable distance, comprising a plurality of transmitters and a receiver. Each transmitter continuously transmits a unique signal. The receiver monitors the signals from the transmitters, and determines when the signal strength therefrom drops below a predetermined threshold level or is missing altogether. When the motor vehicle is moved from the owner beyond an acceptable distance, the signal strength will drop below the threshold level and will not be detected, indicating an alert condition. Once an alert condition is established by the receiver, a beeping unit is activated to provide an audible warning to the owner that the motor vehicle has been stolen, so that the authorities can be immediately notified.

4 Claims, 3 Drawing Sheets

MOTOR VEHICLE THEFT DETECTION DEVICE

CROSS REFERENCES AND RELATED SUBJECT MATTER

This application is a continuation-in-part of utility application Ser. No. 09/767,071, filed in the United States Patent Office on Jan. 23, 2001 now abandoned.

BACKGROUND OF THE INVENTION

The invention relates to an motor vehicle theft detection device. More particularly, the invention relates to a device for warning a property owner when a car has been stolen, because the motor vehicle has exceeded a predetermined distance from the owner.

Police statistics indicate that millions of motor vehicles are stolen every year. Auto owners generally seek to prevent car theft through the use of alarms. Very frequently, the motor vehicles are stolen right beneath their owner's noses.

Alarms are generally ineffective in preventing motor vehicle theft. A professional car thief can quickly bypass an motor vehicle alarm. However, most people ignore car alarms, believing them all to be false alarms set off by owners who inadvertently trigger them. Accordingly, many thieves will continue to steal a car, even while the alarm sounds.

Accordingly, it has been well established that motor vehicle alarms are ineffective at preventing car theft. Other solutions must be proposed in an attempt at combating auto theft.

SUMMARY OF THE INVENTION

It is an object of the invention to produce an motor vehicle theft prevention device which prevents motor vehicle theft. Accordingly, the motor vehicle theft prevention device will warn a property owner when the motor vehicle has traveled more than a predetermined distance away from the owner.

It is a still further object of the invention that the device is unobtrusive to the owner. Accordingly, the receiver of the invention may be embodied in "beeper-like" housings.

It is a further object of the invention that the device allows the proximity of several motor vehicles to be monitored simultaneously. Accordingly, the owner is alerted when any one of the monitored motor vehicles has been moved beyond an appropriate range, and is informed which motor vehicle has been moved beyond said range.

It is a still further object of the invention that the appropriate proximity range for each of the monitored motor vehicles may be separately adjusted by the user.

The invention is an motor vehicle theft detection device, for warning an motor vehicle owner that an motor vehicle has been brought beyond a predetermined acceptable distance, comprising a plurality of transmitters and a receiver. Each transmitter continuously transmits a unique signal. The receiver monitors the signals from the transmitters, and determines when the signal strength therefrom drops below a predetermined threshold level or is missing altogether. When the property is moved from the owner beyond an acceptable distance, the signal strength will drop below the threshold level and will not be detected, indicating an alert condition. Once an alert condition is established by the receiver, a beeping unit is activated to provide an audible warning to the owner that the motor vehicle has been stolen, so that the authorities can be immediately notified.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
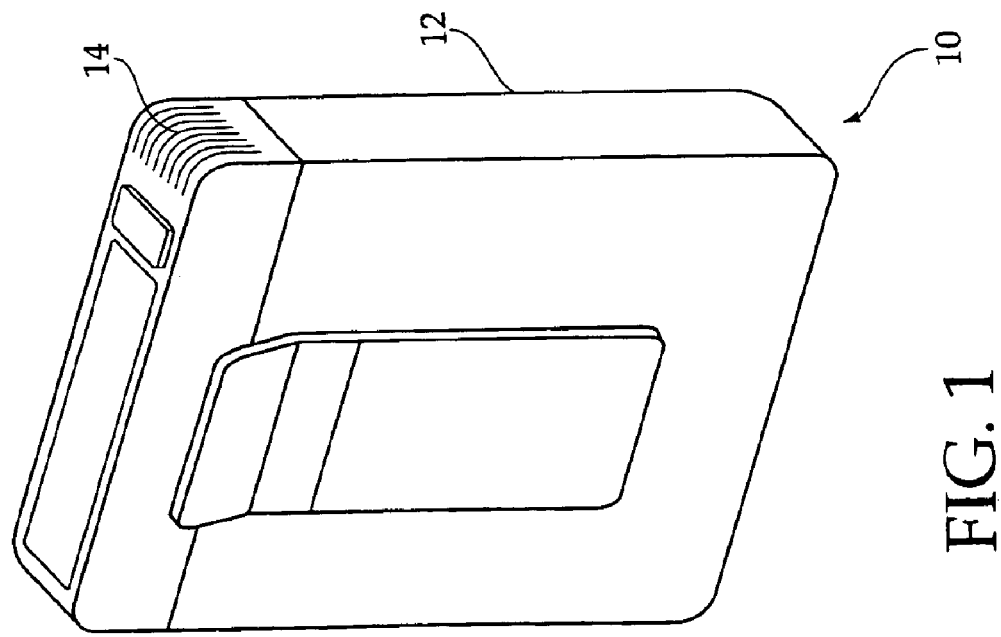
FIG. 1 is a diagrammatic perspective view, illustrating a receiver suitable for use by an motor vehicle owner, according to the present invention.

FIG. 1 illustrates a receiver 10 according to the present invention. The receiver 10 has a housing 12, which may be configured similar to that of a typical pager. The receiver 10 has a beeping unit 14, for producing an audible warning when an alert condition is established.

Figure 2:
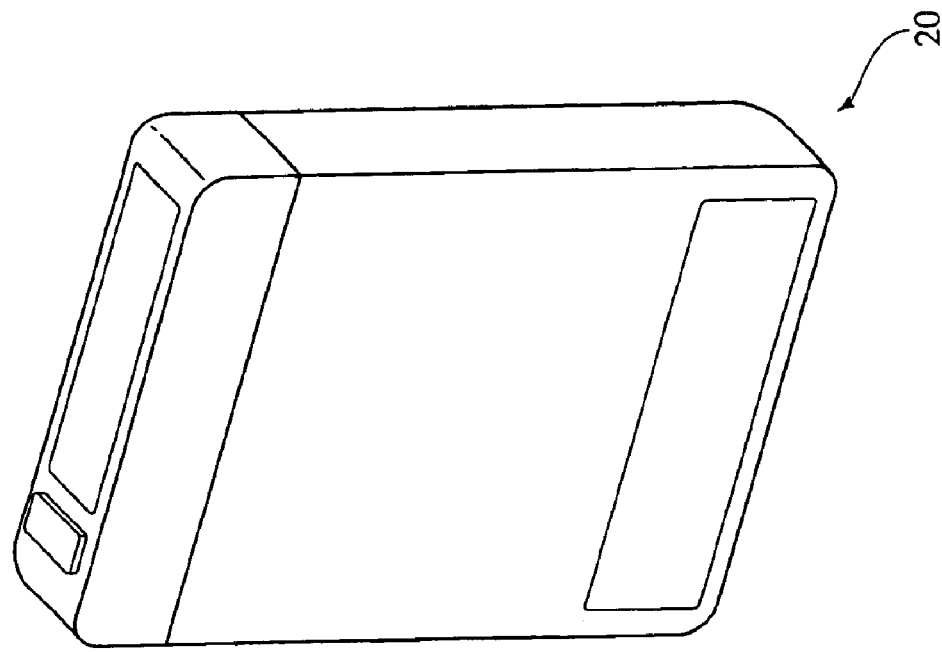
FIG. 2 is a diagrammatic perspective view, illustrating a transmitter, suitable for attachment to or within an motor vehicle, according to the present invention.

FIG. 2 illustrates a transmitter 20, which is associated with an item of property, namely an motor vehicle. The transmitter is shown in FIG. 2 as being embodied in a pager-like housing, so that it may be portable. Accordingly, the transmitter 20 could be used within different motor vehicles. Alternatively, the transmitter 20 could be permanently installed in the motor vehicle, and hard-wired to the vehicle's electrical system, so as to derive a constant source of power therefrom.

Figure 3:
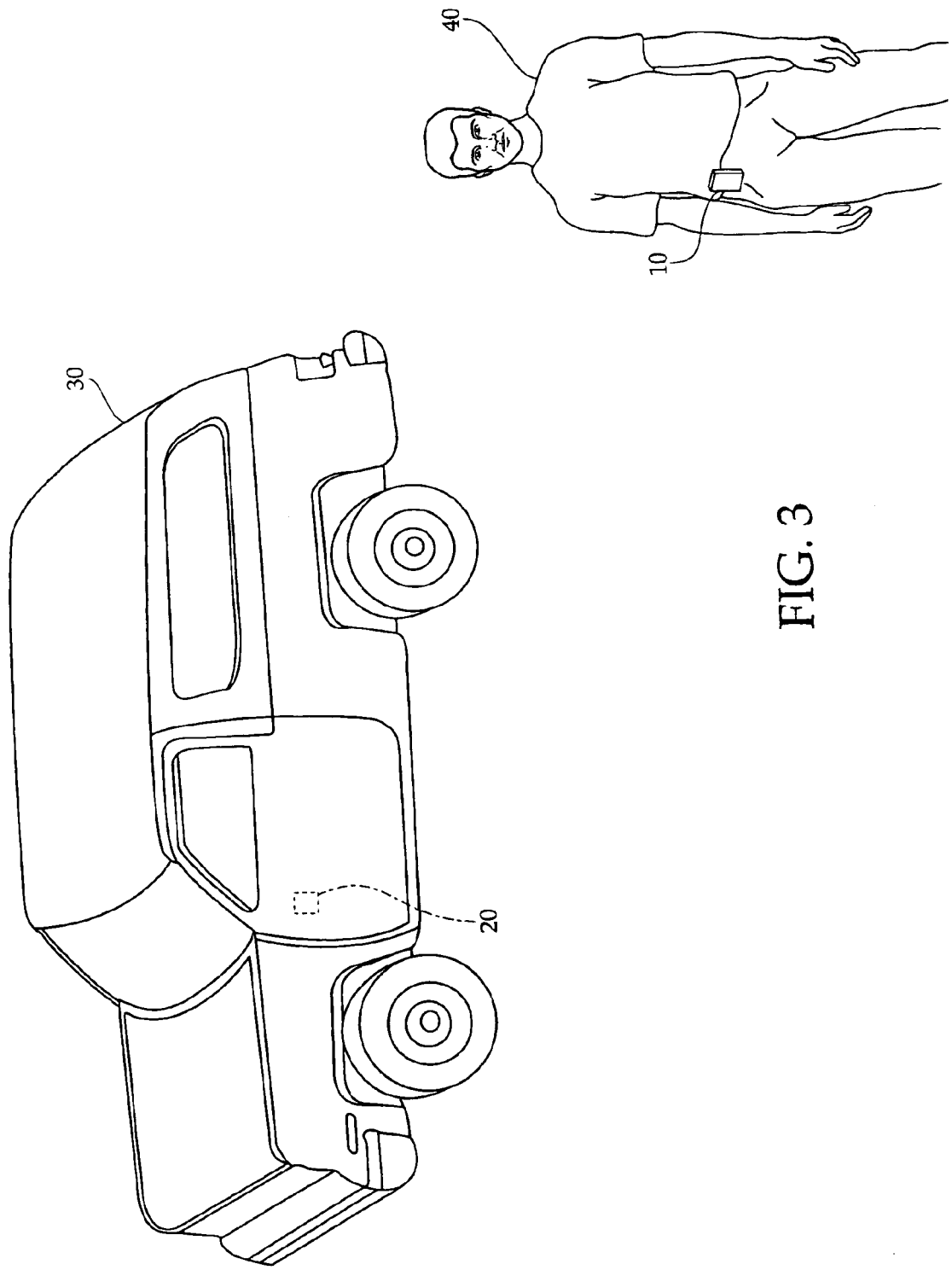
FIG. 3 illustrates an owner and an motor vehicle, wherein the owner is wearing the receiver, and the motor vehicle is equipped with the transmitter.

In FIG. 3, an motor vehicle 30 contains the transmitter 20, and an owner 40 is wearing the receiver 10. At all times, the receiver expects a continuous signal from the transmitter, and expects the signal to be of a signal strength that exceeds a predetermined threshold strength which would indicate an acceptable distance between the owner and motor vehicle 30 has not been exceeded. The acceptable distance might be set by the owner at a distance such as one hundred twenty feet, or may be set as the average distance between a parked motor vehicle and the owner's home. The signal preferably consists of a unique identifying signal transmitted at a constant interval—for example, every three seconds.

When the motor vehicle 30 is moved from the owner 40 by more than the acceptable distance, the signal strength from the transmitter 20 will drop below the threshold level so that the identifying signal will not be detected, and an alert condition will be established. In response to the alert condition, the beeping unit 14 will be activated to warn the owner that the motor vehicle 30 has been moved beyond the acceptable distance. In response to the beeping signal, the motor vehicle owner will know conclusively that the motor vehicle 30 has been moved—since the distance between an motor vehicle and a stationary owner would not otherwise vary. Accordingly, the owner can immediately alert the authorities of the theft.

The device may be attached to an existing car alarm or, alternatively, installed into an motor vehicle in place of a car alarm. Further, the device may be wired to a car battery in order to maintain a constant signal to the owner of the motor vehicle.

Figure 4:
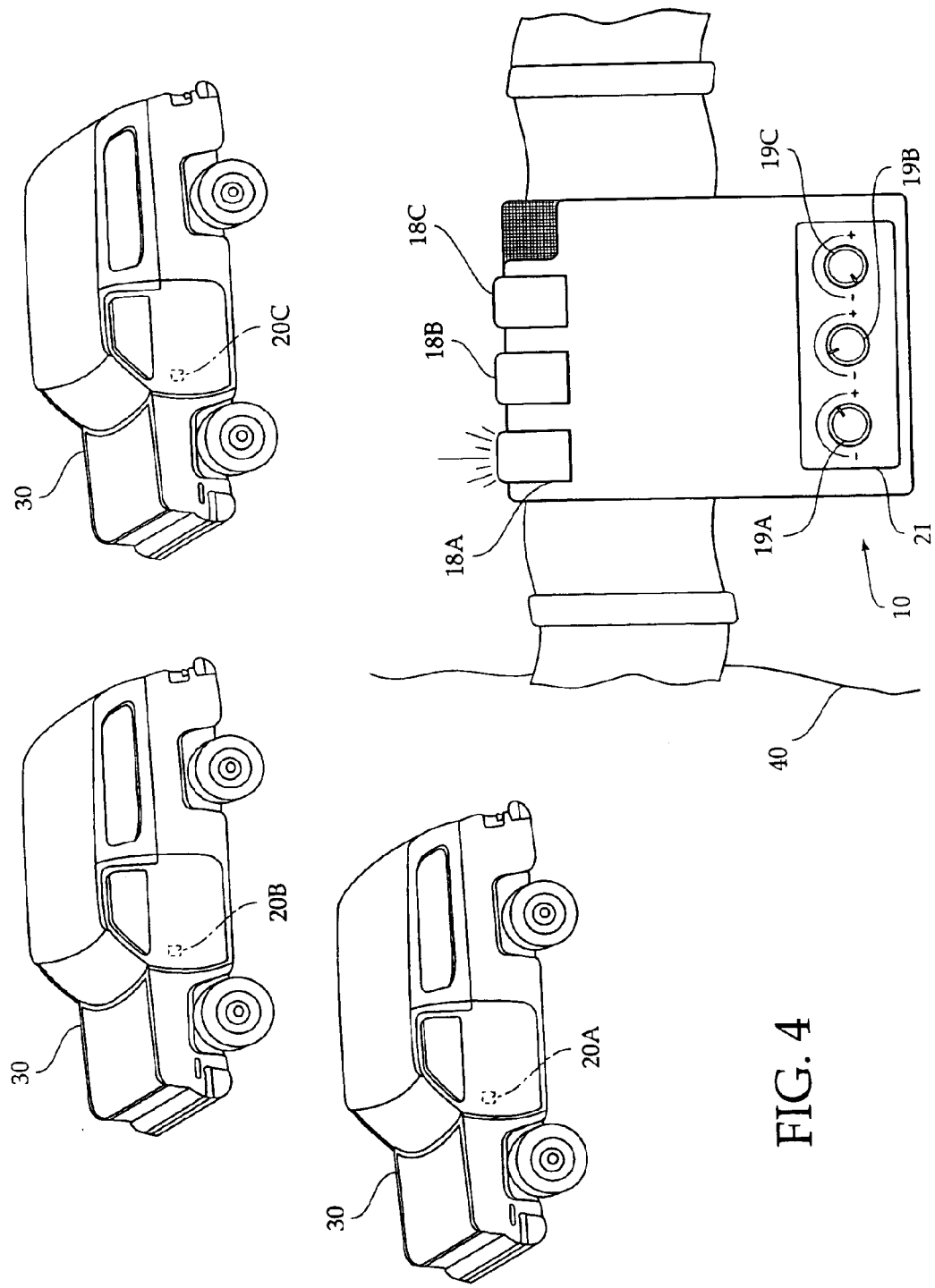
FIG. 4 illustrated multiple motor vehicles which each having a transmitter, as well as an motor vehicle owner wearing an embodiment of the receiver equipped for monitoring the separate transmitters.

In the example provided in FIG. 3, the property monitored is one motor vehicle. However, the same principles would apply to the proximity monitoring of more than one motor vehicle simultaneously. Accordingly, in FIG. 4, the system is illustrated wherein separate transmitters 20A, 20B, and 20C are attached to or located within separate motor vehicles 30, respectively. The receiver 10 is attached on the owner 40. However, the receiver 10 has been modified to allow separate monitoring of the distinct transmitters 20A, 20B, and 20C.

Each of the transmitters 20A, 20B, and 20C transmit a unique identifying signal associated with that transmitter at a constant interval. The receiver 10 monitors these signals, and determines when one of the signals is missing. When one of the signals is missing, an alert condition is indicated, causing an audible alarm to sound. However, a unique visual alert is also provided to indicate which of the transmitters has exceeded the predetermined proximity. The unique visual alert comprises distinct indicating lights 18A, 18B, and 18C, whose illumination indicates an alert condition for transmitters 20A, 20B, and 20C respectively.

In addition, the acceptable distance can be set with distinct sensitivity controls 19A, 19B and 19C, which set the acceptable distance for transmitters 20A, 20B, and 20C, respectively. By controlling the sensitivity, each of the sensitivity controls will vary the threshold by which the unique signal from its associated transmitter will not be detected and thus will be deemed an alert condition.

In conclusion, herein is presented an motor vehicle theft protection system which allows owners to safeguard their motor vehicles by warning the owners that their motor vehicles have been unexpectedly moved an unacceptable distance from said owner.

What is claimed is:

1. A motor vehicle theft detection system for preventing the theft of one or more motor vehicles from an owner, comprising:
   a plurality of motor vehicles;
   a plurality of distinct transmitters, wherein each transmitter is mounted inside each of the motor vehicles and has a unique signal;
   a receiver for separately monitoring and detecting the unique signals from each of the transmitters and assuring that each unique signal exceeds a threshold level, and for visually and audibly indicating when one of the unique signals is not detected above the threshold level which indicates that the transmitter has exceeded the acceptable distance, wherein the receiver has distinct visual indicators for each of the transmitters that notify the owner which of the transmitters has exceeded a predetermined acceptable distance from the receiver, and wherein the owner can separately set the acceptable distance for each transmitter;
   wherein said each transmitter transmits its unique signal at a constant interval;
   wherein the acceptable distance for each transmitter is set by a distinct sensitivity control which determines the threshold beneath which the unique signal from that transmitter will not be detected; and
   wherein said each transmitter is attached to an existing car alarm.

2. The motor vehicle theft detection system as recited in claim 1, wherein each transmitter is wired to a car battery in order to maintain a constant signal to the motor vehicle owner.

3. The motor vehicle theft detection system as recited in claim 1, wherein the receiver has a housing configuration that is similar to that of a typical pager so that a user can wear the receiver on his person.

4. The motor vehicle theft detection system as recited in claim 1, wherein each transmitter is embodied in a portable pager-like housing so that the transmitter can be selectively attached to different motor vehicles.

* * * * *